United States Patent [19]

Matsuura et al.

[11] 4,196,106
[45] Apr. 1, 1980

[54] FIBER-REINFORCED RUBBER ARTICLE AND PROCESS FOR PRODUCING THE SAME

[75] Inventors: Tetsuro Matsuura, Narita; Shinji Yamamoto, Ichihara; Denichi Oda, Ichihara; Yasuo Matsumori, Ichihara, all of Japan

[73] Assignee: Ube Industries, Ltd., Ube, Japan

[21] Appl. No.: 837,989

[22] Filed: Sep. 29, 1977

[30] Foreign Application Priority Data

Oct. 7, 1976 [JP] Japan .................................. 51-119865

[51] Int. Cl.² ........................... C08L 7/00; C08L 9/00; C08L 11/00
[52] U.S. Cl. ........................................ 260/5; 525/133; 525/213; 525/236; 525/237; 525/914
[58] Field of Search ................... 260/894, 889, 5, 845, 260/888, 890

[56] References Cited

U.S. PATENT DOCUMENTS

| | | | |
|---|---|---|---|
| 3,738,948 | 6/1973 | Dunnom | 260/5 |
| 3,827,991 | 8/1974 | Ando et al. | 260/5 |
| 4,005,054 | 1/1977 | Bonnefon et al. | 260/889 |

*Primary Examiner*—Wilbert J. Briggs, Sr.
*Attorney, Agent, or Firm*—Miller & Prestia

[57] ABSTRACT

Disclosed is a process of producing a fiber-reinforced rubber article having excellent mechanical strength and modulus of elasticity, and exhibiting rubber-like elasticity, by providing a rubber composition from a vulcanizable rubber material, a vulcanizing agent and 1,2-polybutadiene staple fibers in an amount of 1 to 20 parts by weight per 100 parts by weight of the rubber material, shaping and vulcanizing the rubber composition to provide a shaped, vulcanized article in which surface portions of said 1,2-polybutadiene staple fibers are vulcanized and cross-linked to the vulcanized rubber material matrix.

12 Claims, 1 Drawing Figure

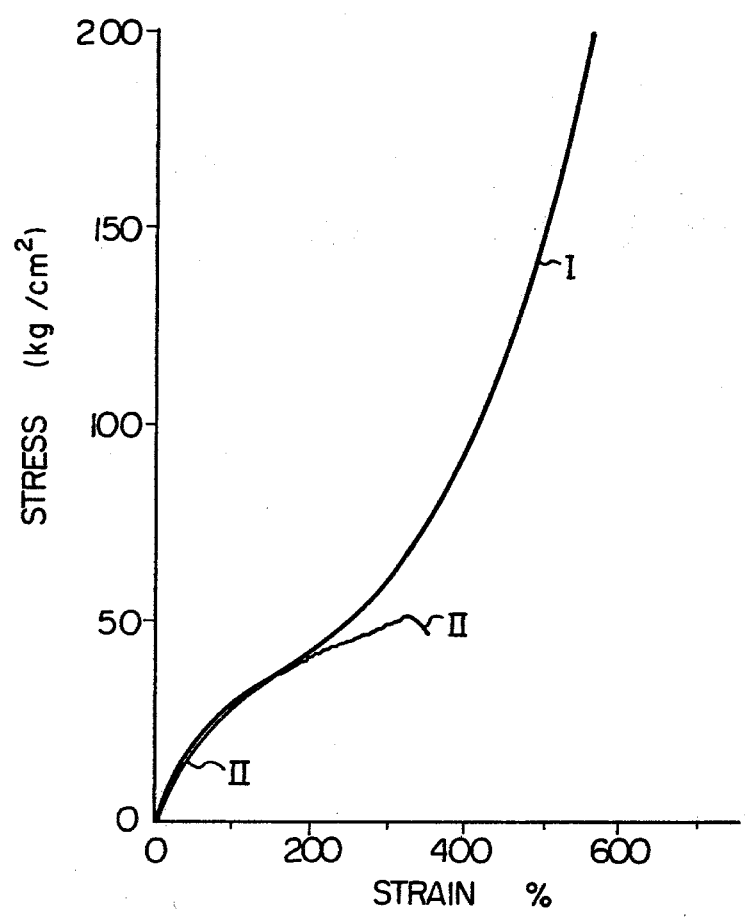

FIBER-REINFORCED RUBBER ARTICLE AND PROCESS FOR PRODUCING THE SAME

The present invention relates to a novel fiber-reinforced rubber article and a process for producing the same. More particularly, the present invention relates to a fiber-reinforced rubber article having excellent mechanical strength, elongation, modulus of elasticity and rubber elasticity, and a process for producing the same.

It is well-known that conventional fiber-reinforced rubber articles are produced by uniformly dispersing organic polymer fibers, for example, nylon 6, nylon 66, polyester, formalized polyvinyl alcohol and regenerated cellulose fibers, or inorganic fibers, for example, glass and carbon fibers, in a matrix of a rubber material to provide a rubber composition and; then, subjecting the rubber composition to a vulcanizing process at an elevated temperature. In order to obtain a fiber-reinforced rubber article having a high mechanical strength and modulus of elasticity by using the conventional processes, it is required that the reinforcing fibers be used in a large amount of 30 parts by weight or more per 100 parts by weight of the rubber material. This large amount of the reinforcing fibers can result in a high mechanical strength and modulus of elasticity of the resultant fiber-reinforced rubber article. However, the use of such a large amount of the reinforcing fibers causes the resultant fiber-reinforced rubber material to be provided with a significantly reduced elongation and to exhibit substantially no rubber-like elasticity and resiliency. Also, the use of the large amount of the reinforcing fibers results in difficulty in evenly dispersing the fibers in the rubber material matrix.

An object of the present invention is to provide a fiber-reinforced rubber article exhibiting rubber-like elasticity and having excellent mechanical strength, elongation and modulus of elasticity, and a process for producing the same.

Another object of the present invention is to provide a fiber-reinforced rubber article and a process for producing the same wherein difficulties are not encountered in blending the reinforcing fibers to the rubber material matrix.

The fiber-reinforced rubber article mentioned in the objects above is produced by the process of the present invention which comprises: preparing a composition comprising a matrix containing a rubber material capable of being vulcanized and vulcanizing agent, and 1,2-polybutadiene staple fibers uniformly dispersed in said rubber material matrix, said 1,2-polybutadiene staple fibers being in an amount of 1 to 20 parts by weight per 100 parts by weight of said rubber material, and; shaping and vulcanizing said composition to form a shaped, vulcanized article.

The resultant fiber-reinforced rubber article of the present invention comprises a vulcanized rubber material matrix and 1,2-polybutadiene staple fibers which are in an amount of 1 to 20 parts by weight per 100 parts by weight of the rubber material and uniformly dispersed in the rubber material matrix, surface portions of the 1,2-polybutadiene staple fibers being also vulcanized to form cross-linkages between the 1,2-polybutadiene staple fibers and the rubber material matrix.

The above-mentioned and other features and advantages of the present invention will be more fully understood from the following description and the accompanying drawing, which shows stress-strain curves of the fiber-reinforced rubber articles prepared in accordance with the process of the present invention and a process other than that of the present invention.

The rubber material usable for the present invention is not restricted to a special group of rubber materials, as long as the rubber material can be vulcanized by a conventional vulcanizing method and can be converted into a vulcanized rubber material having a high rubber-like elasticity (resiliency). For example, the rubber material is selected from natural rubber, cis-1,4-polybutadiene, polyisoprene, polychloroprene, styrene-butadiene copolymers, isoprene-isobutylene copolymers, ethylene-propylene-diene terpolymers and mixtures of two or more of the above-mentioned polymers.

The 1,2-polybutadiene staple fibers usable for the present invention can be produced in accordance with, for example, the methods of Japanese Patent Application Publication Nos. 50-10417 (1975) and 51-33207 (1976). That is, 1,2-polybutadiene is melted at a temperature higher than the melting point of the 1,2-polybutadiene; the melt is extruded through a plurality of spinning orifices to produce undrawn 1,2-polybutadiene filaments; the undrawn filaments are drawn at a proper draw ratio, for example, of 1.5 to 5.0 at a proper temperature, for example, of from 20° to 150° C., and; then, the drawn filaments are cut to provide 1,2-polybutadiene staple fibers.

The 1,2-polybutadiene preferably has a melting point of at least 10° C. above the vulcanizing temperature to be applied to the 1,2-polybutadiene fiber-reinforced rubber article. It is also preferable that the 1,2-polybutadiene contains 80% or more of 1,2-structure.

Each of the 1,2-polybutadiene staple fibers preferably has a length of from 1 to 200 mm and a cross-sectional diameter of from 4 to 90 microns (from 0.1 to 50 denier), more preferably, from 4 to 30 microns (from 0.1 to 6.0 denier). Also, it is preferably that the 1,2-polybutadiene staple fibers have a tensile strength of at least $1 \times 10^3 kg/cm^2$, more preferably, from $1 \times 10^3$ to $1 \times 10^4 kg/cm^2$, and an initial modulus of elasticity of at least $1 \times 10^4 kg/cm^2$, more preferably, from $1 \times 10^4$ to $1 \times 10^5 kg/cm^2$.

In the process of the present invention, the 1,2-polybutadiene staple fibers to be dispersed in the rubber material matrix is in an amount of 1 to 20 parts by weight per 100 parts by weight of the rubber material. When the 1,2-polybutadiene staple fiber is used in an amount of less than 1 part by weight, a fiber-reinforced rubber article having a high mechanical strength and modulus of elasticity will not be obtained. If the amount of the 1,2-butadiene staple fibers is more than 20 parts by weight, the resultant fiber-reinforced rubber article will be provided with a very poor elongation and exhibit substantially no rubber-like elasticity.

In the process of the present invention, the vulcanizing agent can be selected from all types of conventional vulcanizing agents as long as the types of vulcanizing agents can vulcanize the rubber material to be used. For example, the vulcanizing agent can be selected from sulphur, organic peroxides, aromatic nitro compound, and selenium and tellurium compounds. The vulcanizing agent is preferably contained in an amount of 0.5 to 5.0% based on the weight of the rubber material.

The 1,2-polybutadiene staple fibers can be dispersed in the rubber material matrix by using any conventional blending apparatuses, for example, Brabender type blender, roller kneader and Banbury internal mixer.

In the process of the present invention, the rubber composition can contain resorcin, hexamethylenetetramine (RH mixture) and, optionally, powdered silica (HRH mixture) to enhance the mechanical strength and modulus of elasticity of the resultant fiber-reinforced rubber article. The rubber composition also may contain one or more additives, for example, fillers, vulcanization accelerators, anti-aging agents, process oils and reinforcing materials different from the 1,2-polybutadiene fibers.

After the completion of the preparation of the rubber composition, it is preferable that the ratio (L/D) of the length (L) to the diameter (D) of the 1,2-polybutadiene staple fibers in the resultant rubber composition be in a range of from 20° to 200° C. During the preparation of the rubber composition, the 1,2-polybutadiene staple fibers are broken and, therefore, the ratio of the length to the diameter of the 1,2-polybutadiene staple fibers is reduced. The ratio L/D of the 1,2-polybutadiene staple fibers can be controlled by controlling the blending conditions, for example, blending temperature, speed, time and shearing force to be applied to the fibers. For example, when a roller kneader is used, the shearing force can be controlled by adjusting the clearance between a pair of kneading rollers. Also, the reduction in the ratio (L/D) of the 1,2-polybutadiene staple fibers can be minimized by elevating the temperature of the kneading rollers. This feature will be illustrated in the comparison of Example 1 with comparative Example 1 hereinafter.

In the process of the present invention, the rubber composition is shaped and vulcanized to form a shaped, vulcanized article. The shaping process may be carried out simultaneously with the vulcanizing process. Otherwise, the shaping process may be followed by the vulcanizing process. The shaping process may be carried out in accordance with any conventional method for shaping the rubber materials.

In the process of the present invention, the type of vulcanizing process may be selected from any conventional processes taking into account the uses of the resultant fiber-reinforced rubber articles. The vulcanizing temperature can also be selected taking into account the types of rubber material used and the uses of the resultant fiber-reinforced rubber articles. Generally, it is preferable that the vulcanizing temperature be in a range of from 120° to 180° C.

By the vulcanizing process, not only the rubber material is vulcanized, but the surface portions of the 1,2-polybutadiene staple fibers are also vulcanized so as to form cross-linkages between the 1,2-polybutadiene staple fibers and the rubber material matrix.

The resultant fiber-reinforced rubber article produced by the process of the present invention has an excellent mechanical strength and modulus of elasticity. The modulus of elasticity of the fiber-reinforced rubber article can be remarkably enhanced by adding carbon black to the rubber material matrix.

As stated hereinbefore, the fiber-reinforced rubber article of the present invention exhibits a rubber-like elasticity, whereas conventional fiber-reinforced rubber articles exhibits substantially no rubber-like elasticity. Referring to the accompanying drawing, Curve I is a stress-strain curve of a fiber-reinforced rubber article prepared in Example 1 in accordance with the process of the present invention, and Curve II is a stress-strain curve of another fiber-reinforced rubber article produced in Comparison Example 1 in accordance with a process different from that of the present invention. Curve I is in the form of a reversed S. The article having this form of stress-strain curve is provided with a rubber-like elasticity. Curve II is quite different in form from Curve I and similar to the stress-strain curves of thermoplastic resin having no rubber-like elasticity. That is, the fiber-reinforced rubber material having the stress-strain curve of Curve II has substantially no rubber-like elasticity.

The fiber-reinforced rubber article of the present invention can be utilized as material for producing tires, belts, hoses, and footwear which need to have a high mechanical strength, modulus of elasticity and rubber-like elasticity.

The present invention will be further illustrated by the following examples, which are presented for the purpose of illustration only and should not be interpreted as limiting the scope of the present invention.

In the examples, the physical properties of the fiber-reinforced rubber articles are determined in accordance with the methods of ASTM D 412-61 T.

The properties of 1,2-polybutadiene staple fibers and nylon 6 staple fibers which were used in the examples, are as follows.

| 1,2-polybutadiene fiber | |
|---|---|
| Content of 1,2-structure | 98% |
| Melting point | 190° C. |
| Denier | 1.3 |
| Length | 2 mm |
| Diameter | 12 microns |
| L/D | 166 |
| Initial modulus of elasticity | $1.6 \times 10^4$ kg/cm$^2$ |
| Tensile strength | $1.9 \times 10^3$ kg/cm$^2$ |
| Elongation at break | 16% |
| Nylon 6 fiber | |
| Denier | 8.7 |
| Length | 2 mm |
| Diameter | 32 microns |
| L/D | 62.5 |
| Initial modulus of elasticity | $4.0 \times 10^4$ kg/cm$^2$ |
| Tensile strength | $9.2 \times 10^3$ kg/cm$^2$ |
| Elongation at break | 26% |

In the examples, the terms "part" and "percent" are all based on weight.

EXAMPLE 1

A Brabender type blender was charged with 100 parts of natural rubber of International Standard RSS3, 5 parts of the above-mentioned 1,2-polybutadiene staple fibers, 2 parts of stearic acid, 3 parts of zinc oxide powder, 15 parts of silica powder and 2.5 parts of resorcin. The mixture was kneaded in the blender at a temperature of 80° C. for 5 minutes. The resultant blend was mixed with 2 parts of sulphur, 1 part of dibenzothiazyl sulphide and 1.6 parts of hexamethylenetetramine, by using a mixing rollers, at a roller temperature of 83° C., for 5 minutes, to provide a rubber composition. The ratio of the length to the diameter of the 1,2-polybutadiene staple fibers in the rubber composition was reduced to about 30. The rubber composition was shaped by using a metal mold having a desired configuration and size. The shaped composition was subjected to a vulcanizing process at a temperature of 150° C. for 40 minutes. A fiber-reinforced rubber article was obtained. The properties of the article are shown in Table 1. The accompanying drawing shows a stress-strain Curve I of the fiber-reinforced rubber article of the present example.

Comparative Example 1

The same procedures as those mentioned in Example 1 were followed, except that 5 parts of the aforementioned nylon 6 staple fibers were used instead of the 1,2-polybutadiene staple fibers. The ratio of the length to the diameter of the nylon 6 staple fibers in the rubber composition was reduced to about 50 by the Brabender and roller kneading operations. The properties of the resultant shaped rubber article are shown in Table 1. The accompanying drawing shows a stress-strain Curve II of the fiber-reinforced rubber article of Comparison Example 1.

EXAMPLE 2

Procedures identical to those used in Example 1 were carried out except that the roller kneading operation was carried out at a roller temperature of 64° C. By the Brabender and roller kneading operations, the ratio of the length to the diameter of the 1,2-polybutadiene staple fibers in the rubber composition was reduced to about 22. The properties of the resultant shaped article are shown in Table 1.

EXAMPLE 3

The same procedures as those described in Example 1 were followed, except that the resorcin, hexamethylenetetramine and silica powder were not added to the rubber composition. The ratio of the length to the diameter of the 1,2-polybutadiene staple fibers in the rubber composition after the Brabender and roller kneading operations was reduced to about 35. The properties of the resultant shaped article are shown in Table 1.

Table 1

| Example No. | 100% Modulus (kg/cm$^2$) | 300% Modulus (kg/cm$^2$) | Tensile strength (kg/cm$^2$) | Ultimate elongation (%) |
|---|---|---|---|---|
| Example 1 | 29.5 | 60.0 | 200 | 570 |
| Comparison example 1 | 31.6 | 47.9 | 51 | 350 |
| Example 2 | 17.6 | 39.9 | 160 | 594 |
| 3 | 22.6 | 37.9 | 148 | 640 |

Table 1 and the accompanying drawing show that the shaped article of Comparison Example 1 had a poor tensile strength and a low ultimate elongation, whereas the shaped articles of Examples 1, 2 and 3 had an excellent tensile strength and ultimate elongation.

EXAMPLE 4

A Brabender type blender was charged with a mixture of 20 parts of a natural rubber of International Standard RSS3, 80 parts of cis-1,4-polybutadiene (made by Ube Industries, Limited, and carrying the trademark Ubepol-100), 5 parts of the aforementioned 1,2-polybutadiene staple fibers, 1 part of stearic acid, 2 parts of zinc oxide, 15 parts of silica powder, 2.5 parts of resorcin and 1 part of phenyl-β-naphthylamine. The mixture was kneaded in the blender at a temperature of 80° C. for 5 minutes. The resultant blend was mixed with 2 parts of sulphur, 0.1 parts of tetramethylthiuram disulphide, 1 part of N-cyclohexylbenzothiazyl-2-sulphenamide and 1.6 parts of hexamethylenetetramine, by using a roller kneader, at a roller temperature of 44° C., for 5 minutes, to provide a rubber composition. By the kneading operation, the ratio of the length to the diameter of the 1,2-polybutadiene staple fibers was decreased to about 40. The rubber composition was shaped by using a metal mold. The shaped composition was subjected to a vulcanizing process at a temperature of 150° C. for 40 minutes. A shaped article was obtained. The properties of the resultant rubber article are shown in Table 2.

EXAMPLE 5

The same procedures as those utilized in Example 4 were carried out, except that 100 parts of a styrene-butadiene copolymer (made by Nippon Synthetic Rubber Co. and carrying the trademark SBR 1500) were used in place of the natural rubber and cis-1,4-polybutadiene. By the kneading operation, the ratio of the length to the diameter of the 1,3-polybutadiene staple fibers in the rubber composition was reduced to about 40.

The properties of the resultant article are shown in Table 2.

Table 2

| Example No. | 100% Modulus (kg/cm$^2$) | 300% Modulus (kg/cm$^2$) | Tensile strength (kg/cm$^2$) | Ultimate elongation (%) |
|---|---|---|---|---|
| 4 | 32.7 | 49.0 | 93 | 620 |
| 5 | 32.0 | 44.9 | 116 | 740 |

EXAMPLE 6

A Brabender type blender was charged with 60 parts of natural rubber of International Standard RSS3, 40 parts of cis-1,4-polybutadiene (Ubepol-100), 6.8 parts of the aforementioned 1,2-polybutadiene staple fibers, 50 parts of carbon black (made by Mitsubishi Chemical Industrial Co. and carrying the trademark Diablack I), 12 parts of a process oil (made by Toa Fuel Industrial Co. and carrying the trademark Essoprocess Oil H-1), 2 parts of stearic acid, 3 parts of powdered zinc oxide, 0.8 parts of 2,2,4-trimethyl-1,2-dihydroquinone and 1.2 parts of N-phenyl-N'-isopropyl-p-phenylenediamine. The mixture was kneaded in the blender, at a temperature of 80° C., for 5 minutes. The blend was mixed with 1.75 parts of sulphur a 0.75 parts of N-oxydiethylene-2-benzothiazolesulphenamide by using a roller kneader, at a roller temperature of 83° C., for 5 minutes, to provide a rubber composition. By the above kneading operation, the ratio of the length to the diameter of the 1,2-polybutadiene staple fibers in the rubber composition was reduced to about 36.

The rubber composition was shaped by using a metal mold. The shaped composition was subjected to a vulcanizing process at a temperature of 150° C., for 40 minutes. A fiber-reinforced rubber article was obtained. The properties of the resultant article are shown in Table 3.

Comparison Example 2

Procedures identical to those used in Example 6 were repeated, except that no 1,2-polybutadiene fiber was used. The properties of the resultant shaped rubber article are shown in Table 3.

EXAMPLE 7

A Brabender type blender was charged with 100 parts of natural rubber of International Standard RSS3, 7.5 parts of the aforementioned 1,2-polybutadiene staple fibers, 5 parts of powdered zinc oxide, 4 parts of stearic acid, 1 part of phenyl-β-naphthylamine, 5 parts of a process oil (Essoprocess Oil H-1) and 50 parts of carbon black (Diablack I). The mixture was kneaded in the blender, at a temperature of 80° C., for 5 minutes. The resultant blend was mixed with 3 parts of sulphur and 1 part of mercaptobenzothiazole, by using a roller kneader, at a roller temperature of 83° C., for 5 minutes, to provide a rubber composition. The ratio of the length to the diameter of the 1,2-polybutadiene fibers was reduced to about 27 by the kneading operation.

The rubber composition was shaped by using a metal mold. The shaped rubber composition was subjected to a vulcanizing process, at a temperature of 150° C., for 40 minutes. A fiber-reinforced rubber article was obtained. The properties of the article are shown in Table 3.

Comparison Example 3

The same procedures as those mentioned in Example 7 were repeated, except that no 1,2-polybutadiene staple fiber was used. The properties of the resultant article are shown in Table 3.

Table 3

| Example No. | 100% Modulus (kg/cm$^2$) | 300% Modulus (kg/cm$^2$) | Tensile strength (kg/cm$^2$) | Ultimate elongation (%) |
|---|---|---|---|---|
| Example 6 | 46.0 | 110 | 274 | 500 |
| Comparison example 2 | 17.8 | 77.7 | 275 | 650 |
| Example 7 | 65.9 | 176 | 315 | 415 |
| Comparison example 3 | 38.4 | 138 | 316 | 534 |

Table 3 shows that the rubber articles of Comparison Examples 2 and 3 which contain no 1,2-polybutadiene staple fiber, had poor 100% and 300% moduluses.

What is claimed is:

1. A process for producing a fiber-reinforced rubber article, which comprises:
   (1) preparing a composition comprising a matrix containing a rubber material selected from the group consisting of natural rubber, cis-1,4-polybutadiene, polyisoprene, polychloroprene, styrene-butadiene copolymers, isoprene-isobutylene copolymers, ethylene-propylene-diene terpolymers, and mixtures of two or more of the above-mentioned polymers; a vulcanizing agent, and reinforcing staple fibers which consist of 1,2-polybutadiene containing 80% by weight or more of 1,2-structure and are uniformly dispersed in said matrix, said reinforcing staple fibers each having a cross-sectional diameter of from 4 to 90 microns and a length of from 1 to 200 mm and being present in an amount of from 1 to 20 parts by weight per 100 parts by weight of said rubber matrix, and;
   (2) shaping and vulcanizing said composition at a temperature of at least 10° C. below the melting point of said 1,2-polybutadiene staple fibers to form a shaped, vulcanized article.

2. A process as claimed in claim 1, wherein said 1,2-polybutadiene fibers have a tensile strength of at least $1 \times 10^3$ kg/cm$^2$.

3. A process as claimed in claim 2, wherein the tensile strength of said 1,2-polybutadiene fibers is in a range of from $1 \times 10^3$ to $1 \times 10^4$ kg/cm$^2$.

4. A process as claimed in claim 1, wherein said 1,2-polybutadiene fibers have an initial modulus of elasticity of at least $1 \times 10^4$ kg/cm$^2$.

5. A process as claimed in claim 4, wherein the initial modulus of elasticity of said 1,2-polybutadiene fibers is in a range of from $1 \times 10^4$ to $1 \times 10^5$ kg/cm$^2$.

6. A process as claimed in claim 1, wherein said vulcanizing agent is selected from the group consisting of sulphur, organic peroxides and mixtures thereof.

7. A process as claimed in claim 1, wherein said vulcanizing temperature is in a range of from 120° to 180° C.

8. A process as claimed in claim 1, wherein said composition includes a member selected from the group consisting of resorcin, hexamethylenetetramine, powdered silica and mixtures thereof.

9. A process as claimed in claim 1, wherein said shaping process is carried out simultaneously with said vulcanizing process.

10. A process as claimed in claim 1, wherein said shaping process is followed by said vulcanizing process.

11. A fiber-reinforced rubber article comprising:
   (1) a matrix of rubber material, which rubber material is selected from the group consisting of natural rubber, cis-1,4-polybutadiene, polyisoprene, polychloroprene, styrenebutadiene copolymers, isoprene-isobutylene copolymers, ethylenepropylenediene terpolymers, and mixtures of two or more of the above-mentioned polymers, and;
   (2) reinforcing staple fibers which consist of 1,2-polybutadiene containing 80% by weight or more 1,2-structure and are uniformly dispersed in said matrix, said reinforcing staple fibers each having a cross-sectional diameter of from 4 to 90 microns and a length of from 1 to 200 mm and being present in an amount of from 1 to 20 parts by weight per 100 parts by weight of said rubber matrix, and said rubber matrix and surface portion of said 1,2-polybutadiene staple fibers being vulcanized at a temperature of at least 10° C. below the melting point of said 1,2-polybutadiene staple fibers to form cross-linkages between said 1,2-polybutadiene staple fibers and said rubber matrix.

12. A fiber-reinforced rubber article as claimed in claim 11, wherein the ratio (L/D) of the length (L) to the cross-sectional diameter (D) of said 1,2-polybutadiene staple fibers is in a range of from 20 to 200.

* * * * *